Nov. 25, 1947. W. N. FLYNN 2,431,473
TEMPERATURE CONTROL MEANS FOR HOLLOW ROLLS
Filed Feb. 9, 1945 3 Sheets-Sheet 1

Inventor
William N. Flynn
By Rockwell & Bartholow
Attorneys

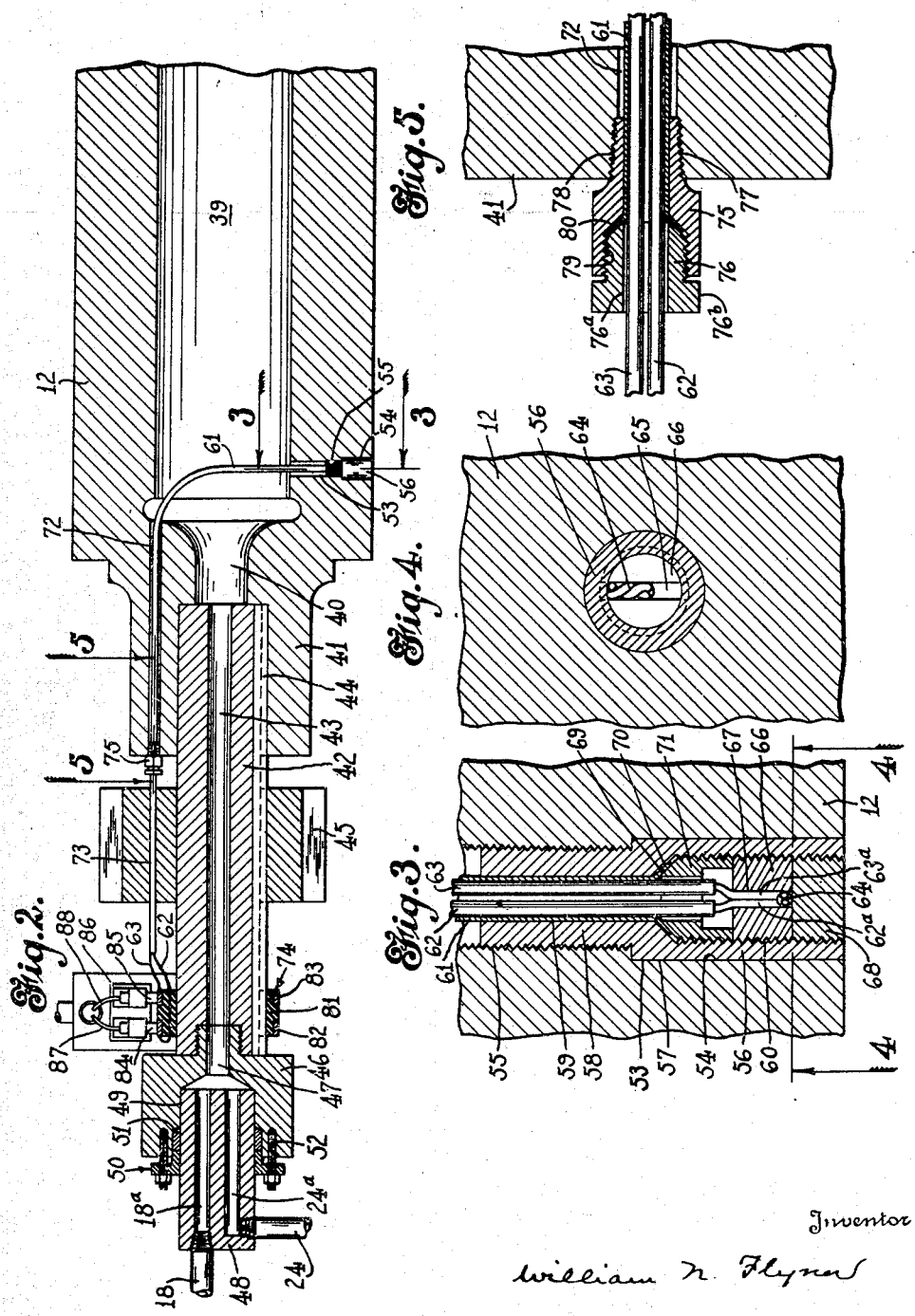

Patented Nov. 25, 1947

2,431,473

UNITED STATES PATENT OFFICE 2,431,473

TEMPERATURE CONTROL MEANS FOR HOLLOW ROLLS

William N. Flynn, Hamden, Conn., assignor to The Seamless Rubber Company, New Haven, Conn., a corporation of Connecticut Application February 9, 1945, Serial No. 577,020

8 Claims. (Cl. 257—2)

This invention relates to temperature control means for hollow rolls, and it has particular reference to the temperature control of rolls such as used in the rubber industry, where the roll is brought to or maintained at a predetermined temperature through the use of a fluid such as water or steam introduced into the interior of the roll. The invention will be described in connection with a roll used for the treatment of rubber, but it is not limited to that application.

In rubber-treating machines it is of advantage to be able to control the temperature of a roll within close limits. For example, in the case of a rubber calender used for applying a coating of rubber adhesive mass to a textile backing, a precise control of the temperature of the rolls is necessary. It is desirable that the roll temperatures be maintained against even what might be termed slight fluctuations.

One of the objects of the invention is to provide an effective temperature control means, so controlling the temperature-influencing fluid introduced into the roll that a very precise control of the temperature of the roll surface is obtained.

Another object is to provide an apparatus in which there is a very direct and effective control of the temperature-varying means from the roll surface, which makes contact with the material such as rubber being acted upon by the roll.

In the accompanying drawings:

Fig. 2 is a vertical sectional view showing a portion of one of the rolls;

Fig. 3 is an enlarged section on line 3—3 of Fig. 2;

Fig. 4 is a section on line 4—4 of Fig. 3;

Fig. 5 is an enlarged section on line 5—5 of Fig. 2;

Figure 6:
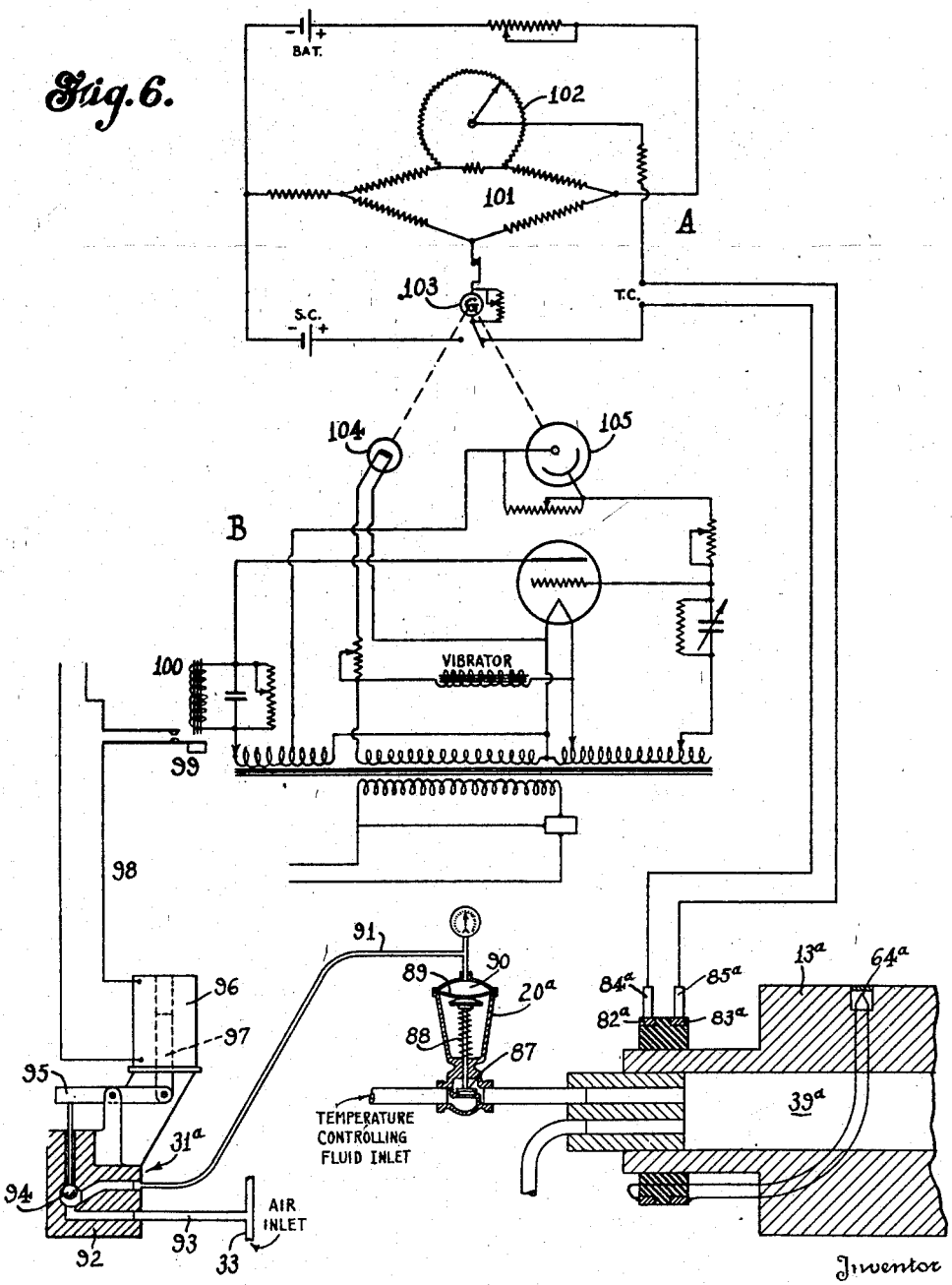
Fig. 6 is a diagrammatic view showing the temperature control means for one of the rolls.

In Figs. 1 to 5, inclusive, the invention is illustrated in connection with a rubber calender installation such as used in applying a rubber adhesive mass to a textile backing. In Fig. 2 a part of the temperature control means used in connection with the middle roll of the calender is illustrated by way of example. In Fig. 6 there is shown diagrammatically the complete temperature control means used in connection with a roll, and the roll here shown may be assumed to be the bottom roll of Fig. 1, or any other hollow roll used for rubber treatment or other work.

Figure 1:
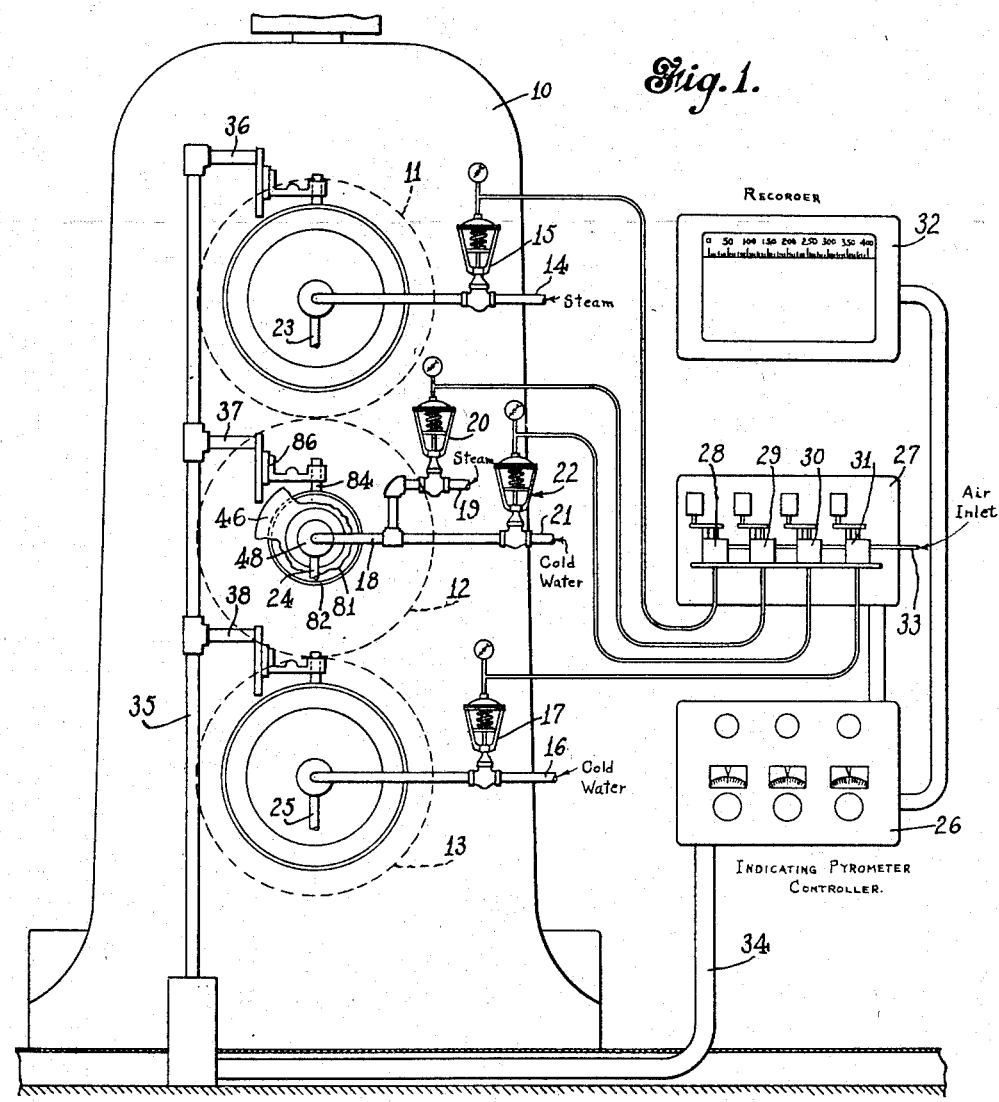
Fig. 1 is a somewhat diagrammatic elevation of a rubber calender installation embodying my improvements.

In Fig. 1 the calender has the usual frame, indicated at 10, having journaled therein the upper roll 11, the middle roll 12, and the lower roll 13. These rolls are hollow, and in each case a predetermined temperature is maintained through the introduction into the hollow roll body of a temperature-controlling fluid or fluids. In the case of the top roll the fluid is steam, in the case of the bottom roll the fluid is cold water, and for controlling the temperature of the middle roll both steam and cold water are employed. A pipe 14 is adapted to carry steam into the interior of the top roll, said pipe being under the control of an air-operated valve 15. A pipe 16 is adapted to carry cold water to the bottom roll, said pipe being under the control of an air-operated valve 17. A pipe 18 is adapted to carry steam or cold water to the middle roll, said pipe being connected to a steam inlet branch 19 under the control of an air-operated inlet valve 20, and to a cold water branch 21 under the control of an air-operated inlet valve 22. Associated with the top roll 11 is an exhaust or outlet pipe 23, which in this case leads off steam, and associated with the middle and lower rolls are corresponding exhaust or outlet pipes 24 and 25, respectively. The outlet pipes as well as the inlet pipes are only partially shown in the drawings.

In Fig. 1 the temperature control means used in connection with the pipes supplying the temperature-controlling fluids is shown diagrammatically. This means as here shown includes an indicating pyrometer controller 26, a panel 27 on which are mounted electrically controlled air valves 28, 29, 30 and 31, and a recorder 32 serving to keep a record of the roll temperatures. An air inlet pipe 33 serves to supply air to the electrically controlled valves 28, 29, 30, 31, and the latter valves, as and when actuated, serve to open the valves 15, 20, 22 and 17, respectively, in order to admit the appropriate fluid into the interior of the corresponding roll.

Leading off from the controller 26 is a wire conduit 34 which is connected to a conduit section 35 at one side of the calender. From the conduit section 35 interior wires are lead through branches 36, 37 and 38, respectively, to brushes and collector rings associated with the respective rolls, for the purpose of carrying current from temperature-responsive electrical devices associated with the rolls in the manner hereinafter described.

In Figs. 2 to 5, inclusive, there is shown by way of example the structure by which temperature control of the middle roll 12 is effected. In Fig. 2 there is illustrated the structure of the roll and its adjuncts adjacent that end to which the inlet pipe 18 and exhaust pipe 24 are connected. The roll shown is of the customary type having a thick side wall and an interior longitudinal bore or chamber 39, adapted to receive the temperature-controlling fluid. In this particular case, the fluid chamber 39 has an inlet 40 in the roll neck 41, and a tubular member 42 entering the neck has a bore 43 in communication with the inlet 40. The tubular member or extension 42 is keyed in the roll by a key 44, and in this particular case a pinion 45 is keyed on the extension by means of key 44. This pinion is used in driving the roll, but as the gearing forms no part of the invention it is not shown in detail. At the outer end of the tubular member 42 a socketed block 46 is screwed into place, said block having a bore 47 communicating with the bore 43, and with bores 18ᵃ and 24ᵃ, respectively, in a member 48 to which the pipes 18 and 24 are connected. The member 48 is held in place in a socket 49 of block 46 by means such as an adjustable gland 50 having packing 51 associated therewith to prevent leakage. The gland has adjusting screws 52 by means of which adjustment can be effected. It is understood that the member 48 is fixedly supported (through the pipes 18 and 24, or otherwise), and that the member 46 rotates thereon inasmuch as member 46 is in fixed relation to the roll. It will be seen that by the structure described it is possible to admit steam or cold water to the interior of the roll. In the case of steam the vapor will fill the chamber of the roll and any excess will pass back through the inlet bore 43 and go through exhaust bore 24ᵃ into the exhaust pipe. In the case of water there will be a filling up of the roll chamber to a certain extent before there is a tendency of the water to pass back out of the inlet bore. After a certain quantity of water has been supplied to the roll, the excess will pass out of the exhaust bore 24ᵃ, which is positioned below the level of the inlet bore 43.

The thermoresponsive device used in connection with the roll is one located closely adjacent the working surface of the roll, and may, as in the example shown, be constituted by a thermocouple housed in the thick wall of the roll and connected to the other parts of the electrical system in the manner described later on. In the form shown, the thermocouple is mounted adjacent the outer end of a radial passage, indicated generally at 53, located adjacent one end of the cylindrical surface of the roll and extending from the cylindrical surface to the roll chamber 39. This passage has a portion 54 adjacent the cylindrical surface and extending inwardly some distance, and another portion 55 of less diameter. Into this passage is screwed a bushing 56 having an outer cylindrical portion 57 engaging the larger portion of the passage and a threaded portion 58 of reduced diameter engaging threads with which a part of passage portion 55 is provided. The threaded shank 58 is provided with a bore 59 in communication with a recess in the head portion of the bushing 56, which recess is open to the outer end of the bushing and is provided with interior screw threads 60. The bore 59 receives a copper tube 61 in which are encased insulated wires 62 and 63 having conductors of different metals, respectively. The outer end portions of these wires are stripped, as shown at 62ᵃ and 63ᵃ, respectively, and connected to form a thermocouple 64. The thermocouple is located in a portion of a transverse slot or notch 65 at the outer end of a small plug 66. The wire portions 62ᵃ and 63ᵃ pass through a bore 67 in the plug 66, said bore leading to the slot 65, which extends diametrically of the plug 66 at the outer face of the latter. The thermocouple is covered over by another plug 68 screwed into the bushing 56 over plug 66. The outer surface of plug 68 is cylindrical and flush with the cylindrical surface of the roll, and the same applies to the bushing 56.

Reference has been made to the copper tube 61 encasing the electric wires. This copper tube is extended at the outer end so as to be located within the chamber or socket in the bushing 56, and has an extremity in the form of a slanting flange 69 lying against a sloping surface 70 in the bushing. The flange 69 is clamped in place by the tapered inner end of a screw plug 71 screwed into the socket in bushing 56 so as to be at the bottom of the socket, the plug 66 holding the plug 71 in clamping position relatively to the copper tube, and the plug 68 in turn holding plug 66 in position.

By the structure just described, the thermocouple is very effectively held in position in close proximity to the cylindrical surface of the roll, the distance from the roll surface being substantially represented by the thickness of the outer plug 68. This plug may have in practice a thickness of say one-half inch, but this dimension is given only by way of example.

The copper tube 61, with its enclosed wires, is extended through the passage 53 and into the chamber 39, and extends across this chamber and into and through a longitudinal passage 72 in the roll so as to project out of the roll at the end of the roll neck at one side of the neck axis. In the form shown the copper tube terminates outside of but near the end face of the roll neck, and the insulated wires continue through a bore 73 in the pinion 45, into adjacency to a collector ring structure 74 associated with the rotating roll structure, as hereinafter described. Where the copper tube is extended out of the roll neck (Fig. 5), it is securely held in position by a clamping means which may include a bushing 75 and a plug 76. The bushing 75 has a threaded shank 77 screwing into a threaded socket 78 formed in the mouth portion of the bore 72. The plug 76 has a threaded portion 79 screwing into a socket in the bushing, and it also has an aperture 76ᵃ through which the wires pass. The socket in the bushing has a tapered bottom against which is placed a slanting flange 80 on the end of the tube, and the inner end of the plug engages this slanting flange so as to provide a connection similar to that shown in Fig. 3. The plug 76 is preferably provided with a polygonal manipulating collar 76ᵇ.

It will be noted that by the structure above described the insulated wires are protected where they are extended through the roll chamber and the bores adjacent thereto, so that it is impossible for the steam or other fluid in the roll to come into contact with them. It will also be noted that at the thermocouple end of the wires, where the latter are not continued to the outside of the roll but on the other hand lie within the roll face, an effective structure is provided for positioning the thermocouple and for preventing contact of the temperature-controlling fluid with the electrical conductors. The encasing tube is continued through the main part of the radial passage through the roll wall so as to have its extremity located within the chamber (in bushing 56) in which the thermocouple is located. The fluid in the roll is prevented from leaking out through the bores or apertures in the roll in which the wires are located.

The collector ring structure 74 previously referred to may comprise a ring 81 of insulating material fixed on tubular extension 42 and having applied to it collector rings 82 and 83, respectively, to which the insulated wires 62 and 63, respectively, are connected. Contacting ring 82 is a fixed collector member or brush 84, and a similar collector member or brush 85 contacts the other ring. The brushes 84 and 85 may be mounted on a suitable bracket member 86 (Fig. 1). Conducting wires 87 and 88 extend from the brushes into the conduit branch 37. A description is now being given of the appurtenances in connection with the middle roll, and it will be understood that similar appurtenances are used in connection with the top and bottom rolls of the calender.

Fig. 6 shows a typical roll as above described, such as the bottom roll, with its electrical connections, showing the manner of controlling the supply of the temperature-controlling fluid. Here the roll is diagrammatically indicated at 13ª, the interior fluid chamber at 39ª, the collector rings at 82ª and 83ª, and the brushes at 84ª and 85ª. The thermocouple is indicated at 64ª. The air-operated valve controlling the supply of fluid to the roll is indicated at 20ª, and the air inlet valve structure is generally indicated at 31ª.

The inlet valve 20ª has a valve member 87 normally held in open position by a spring 88 so as to admit the temperature-controlling fluid to the roll. The valve mechanism is, however, provided with a diaphragm 89 at the bottom of an air chamber 90 supplied with air through a pipe 91 leading from an air valve casing 92, and a certain amount of air pressure will close the inlet valve. Casing 92 is supplied with air, coming in through air inlet pipe 33, by way of a branch 93, and communication between branch 93 and air pipe 91 is controlled by a valve 94 actuated by an arm 95 operable by a solenoid 96 having a movable core 97. The coil of solenoid 96 is connected to a circuit, generally indicated at 98, connected to a suitable power source (not shown), which circuit includes a contact device or switch 99 of a relay 100. The winding of relay 100 forms a part of a control circuit, associated with a Wheatstone bridge circuit of an indicating potentiometer. The bridge circuit is controlled from thermocouple 64ª by connections such as represented in Fig. 6. It will be noted that the brushes 84ª, 85ª are connected by leads to the Wheatstone bridge portion of the apparatus, which is generally indicated at A. The control circuit portion, of which the winding of relay 100 forms a part, is generally indicated at B. The circuit portions A and B together constitute an indicating potentiometer controller of a kind such as described in Fairchild Patent 2,205,777, and it is unnecessary to describe this in detail. It may be said, however, that the Wheatstone bridge is shown at 101 and the variable resistance associated with it at 102. The galvanometer is shown at 103, and, as described in the Fairchild patent, is provided with a mirror receiving light from a light source 104 of circuit B, and adapted to project light upon a light-sensitive vacuum tube 105. Such an apparatus is suitable for the purposes in view and is chosen as illustrative rather than in limitation of the invention.

In the operation of the apparatus shown in Fig. 6, it may be assumed, for purposes of explanation, that the roll is the bottom roll, that the temperature-controlling fluid is cold water, and that water is introduced into the roll for cooling it when the roll temperature ascends to a predetermined point. Under such conditions sufficient current will be generated in the thermocouple when the predetermined temperature is reached to actuate galvanometer 103, causing a deflection of the galvanometer acting on the tube device 105 in a manner to cause relay 100 to be actuated. By this actuation switch 99 is closed, energizing solenoid 96 and closing valve 94 so that, through the connections described, inlet valve 87 will be opened to admit cold water to the roll. This lowers the temperature of the roll, and when the temperature adjacent the thermocouple falls to a predetermined degree, the galvanometer ceases to act in the manner previously described and the relay ceases to hold closed the switch 99, so that valve 94 is opened and valve 87 closed again by the air pressure. In other words, cold water is supplied to the roll from time to time automatically in a manner to hold the surface temperature of the roll at a certain point.

Figure 7:
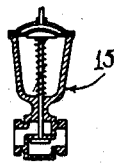
Fig. 7 is a detail view of an inlet valve.

In the case of the top roll, shown in Fig. 1, where the temperature-controlling fluid is steam, connections such as those shown in Fig. 6 can be employed if desired, but in this case a reverse action will take place, for which purpose a reversely acting inlet valve, such as shown in Fig. 7, may be employed, where the spring has a closing action on the valve. Here the inlet valve is held open by the air pressure coming in from air supply 33, but when the surface of the roll reaches the predetermined temperature, the thermocouple will actuate the relay to close the valve 94, cutting off the air supply to the inlet valve and permitting the inlet valve to close under the action of its spring, thus cutting off the supply of steam. When the steam is cut off, the temperature of the roll falls and at a certain point the relay acts to open the inlet valve.

In the case of the middle roll 12, both cold water and steam are supplied to the roll, which is maintained at a temperature between that of the top roll on the one hand and the bottom roll on the other hand. These fluids are introduced through the use of the common inlet pipe 18 and are exhausted by way of the common exhaust pipe 24. A single indicating potentiometer, such as shown in Fig. 6, connected to a single thermocouple may be used, the relay, however, being movable to more than two positions and being arranged to control the air valve device 29 governing the steam inlet valve, and the air valve device 30 governing the inlet valve for cold water. In the form shown, the indicating pyrometer controller panel 26 has at the left a setting device or adjusting device corresponding to the adjusting device 102 of Fig. 6 included in the control circuit for the top roll. At the right of this panel 26 is a similar setting device used in connection with the bottom roll, and in the middle of the panel is a setting device controlling the admission of steam and cold water to the middle roll so that said roll can be maintained at the desired temperature. In the form shown a recorder 32 is used in connection with the indicating pyrometer controller for keeping a record of the roll temperatures. The recorder can be of any preferred kind, and it is understood that the recorder element forms no part of the present invention.

In the operation of rubber treating machines such as calenders, a close temperature control sufficient for the intended purposes has not been provided in so far as I am aware. The fluctuations in temperature of the several rolls have been too great for successful and satisfactory operation in the commercial production of a superior product. Where, for example, a rubber adhesive mass is being applied in a uniform coating to a sheet of fabric, accurate determination of the temperatures of the rolls has been difficult if not impossible. The rubber adhesive mass is in contact with areas of the two upper rolls of the calender, and the textile fabric to which the rubber is being applied takes up a large portion of the circumference of the bottom roll. Under such conditions, that is, when the roll surfaces are taken up to a large extent by the material being worked upon, hand-gauging of the surface temperatures of the rolls is difficult and gives unsatisfactory results. The temperature reading is inaccurate, and this may be due in part to the adherence of rubber to the gauging instrument, adversely affecting the transfer of heat. These drawbacks are overcome by the provision of apparatus such as previously described. Here, notwithstanding the fact that the roll surfaces are taken up with the material being treated, the gauging instrument (in this case the thermocouple or like element) is so close to the cylindrical work-treating surface of the roll as to be subject to the working heat, and on the other hand this gauging element is so well enclosed and protected at all times that its operation is not adversely affected by external conditions. The thermocouple itself is well housed and protected adjacent the cylindrical surface of the roll without in any way causing an objectionable marring of that surface. The plug structure adjacent the thermocouple is small, and the roll can be finished in such a manner that the presence of the thermo-responsive device can be detected only upon careful inspection. The conductor wires leading from the thermocouple are also effectively sealed off and protected throughout their traverse of the roll, as has been described above.

With apparatus such as herein described, there is a very direct and effective transfer of heat from the material being worked on to the thermocouple, and a very simple and effective and satisfactorily operating transfer of electric current from the thermocouple to the relay controlling the circulation of fluid in the roll body. In the use of the apparatus in connection with a rubber calender, for example, it has been possible to maintain the rolls at predetermined temperatures within much closer limits than has been possible heretofore, so far as I am aware. Where a recorder is used in connection with the apparatus, the minuteness of the variations from the settings has been demonstrated, and also the satisfactory operation of the apparatus over considerable periods of time without the need of adjustments.

While the invention is described in connection with the treatment of rubber, with the illustration of only one form of apparatus, this is by way of example only, and it will be apparent that many modifications and changes may be made without departing from the principles of the invention or the scope of the claims.

What I claim is:

1. The combination of a hollow rotating roll for treating rubber or like material, a fluid conduit for carrying temperature-controlling fluid to the interior of the rotating roll, an inlet valve for said conduit, means for operating said valve, a radial bushing housed in the body of the roll so as to have its outer end adjacent the cylindrical roll surface, a thermocouple mounted in said bushing, an external electric device controlling the operation of said valve-operating means, and electrical connecting means between said thermocouple and said last-named device including encased conductors leading from the thermocouple across the fluid-containing space within the roll.

2. The combination of a hollow rotating roll for treating rubber or like material, a fluid conduit for carrying temperature-controlling fluid to the interior of the rotating roll, an inlet valve for said conduit, means for operating said valve, a radial bushing housed in the body of the roll so as to have its outer end adjacent the cylindrical roll surface, a thermocouple mounted in said bushing, an external electric device controlling the operation of said valve-operating means, and electrical connecting means between said thermocouple and said last-named device including encased conductors leading from the thermocouple across the fluid-containing space within the roll, said connecting means also including collector rings rotating with the roll structure.

3. In a device such as described, a hollow roll to which fluid is introduced, a bushing radially disposed in the cylindrical wall of the roll with its outer end adjacent the roll surface, a plug in the end of the bushing, a thermocouple in the bushing protected by the plug, electric conductors leading from the thermocouple across the fluid-holding space in the roll, and means encasing said conductors and protecting them against the action of the fluid.

4. In a device such as described, a hollow roll to which fluid is introduced, a bushing radially disposed in the cylindrical wall of the roll with its outer end adjacent the roll surface, a plug in the end of the bushing, a thermocouple in the bushing protected by the plug, electric conductors leading from the thermocouple across the fluid-holding space in the roll, and means encasing said conductors and protecting them against the action of the fluid, said conductors being extended out of the roll at the neck portion of the latter.

5. In a device such as described, a hollow roll to which fluid is introduced, a bushing radially disposed in the cylindrical wall of the roll with its outer end adjacent the roll surface, a plug in the end of the bushing, a thermocouple in the bushing protected by the plug, electric conductors leading from the thermocouple across the fluid-holding space in the roll, and means encasing said conductors and protecting them against the action of the fluid, said conductors being extended out of the roll at the neck portion of the latter, said encasing protecting means being constituted by a tube having its ends sealed off from the roll interior.

6. In a device such as described, a hollow roll to which fluid is introduced, a bushing radially disposed in the cylindrical wall of the roll with its outer end adjacent the roll surface, a plug in the end of the bushing, a thermocouple in the bushing protected by the plug, electric conductors leading from the thermocouple across the fluid-holding space in the roll, and means encasing said conductors and protecting them against the action of the fluid, said conductors being extended out of the roll at the neck portion of the latter, said encasing protecting means being constituted by a tube having its ends sealed off from the roll interior, one end of the tube being within said bushing and the other end of the tube being disposed exteriorly of the roll neck.

7. The combination of a rotary hollow roll, having a radial passage extending from its interior to a point on its cylindrical face, a bushing held in said passage with its outer end flush with the roll surface, said bushing having a chamber therein, a thermocouple in said chamber, a plug in said chamber positioning said thermocouple, an outer plug holding the first plug in place and having its outer end flush with the roll surface, conductors leading from said thermocouple through said bushing and said radial passage and across the roll to a neck portion of the roll, and a tube fastened in said bushing and enclosing and protecting said conductors.

8. A rubber calender comprising top, bottom and middle hollow rolls, each of which is supplied with a temperature-controlling fluid, valves for controlling the admission of fluid to said rolls, means for operating said valves, and potentiometer controllers for controlling the operation of said last means, said controllers being connected to thermoresponsive elements generating electric currents, said elements being housed within the rolls adjacent the working surfaces of the rolls, said controllers having parts mounted on a common panel and being connected with the thermoresponsive elements by means of collector ring elements rotating with the rolls, said controllers and the fluid supply provisions of the rolls being arranged to maintain the temperature of the top roll substantially above that of the middle roll and the temperature of the middle roll substantially above that of the bottom roll.

WILLIAM N. FLYNN.

REFERENCES CITED

The following references are of record in the file of this patent:

UNITED STATES PATENTS

| Number | Name | Date |
|---|---|---|
| 1,046,925 | Wilson | Dec. 10, 1912 |
| 1,378,927 | Witham | May 24, 1921 |
| 1,557,387 | Thwing | Oct. 13, 1925 |
| 2,106,030 | Junkins | Jan. 18, 1938 |